United States Patent [19]
Vano

[11] 3,806,833
[45] Apr. 23, 1974

[54] VIDEO PRINTER AND FM TO AM SIGNAL CONVERTER

[75] Inventor: Gerald Lawrence Vano, Brockton, Mass.

[73] Assignee: Alden Research Foundation, Westboro, Mass.

[22] Filed: Mar. 17, 1972

[21] Appl. No.: 235,670

[52] U.S. Cl. ............... 332/1, 178/5.4 C, 178/6.6 R, 332/31 R, 332/141
[51] Int. Cl. .......................... H03c 1/50, H04n 5/76
[58] Field of Search ............. 332/1, 16 R, 17, 16 T, 332/23 R, 23 A, 24, 31 R, 31 T, 41, 43 R, 43 B, 48; 325/139; 178/5.4 C

[56] References Cited

UNITED STATES PATENTS

| | | | |
|---|---|---|---|
| 3,348,168 | 10/1967 | Melchior et al. | 332/41 X |
| 3,562,673 | 2/1971 | Caspari | 332/41 X |
| 2,624,041 | 12/1952 | Evans | 332/48 X |
| 2,987,683 | 6/1961 | Powers | 332/48 X |
| 3,054,073 | 9/1962 | Powers | 332/41 X |
| 2,347,398 | 4/1944 | Crosby | 332/48 X |

*Primary Examiner*—Alfred L. Brody
*Attorney, Agent, or Firm*—James H. Grover

[57] ABSTRACT

The frequency modulated (FM) signal of a television camera carrying video information is converted directly to an amplitude modulated (AM) signal which is marked by a facsimile recorder on electrolytic paper. The recorder includes a drum supported helical electrode whose rotation is synchronized with the scanning of the camera. The FM-AM converter includes an operational amplifier varying the amplitude of its FM input signal frequency and a phase shifter with high and low pass frequency channels splitting the FM-AM signal into out of phase components, and a summing network comparing the two components and producing a resultant sinusoidal signal amplitude modulated dependent on the frequency modulation of the input signal.

14 Claims, 3 Drawing Figures

VIDEO PRINTER AND FM TO AM SIGNAL CONVERTER

BACKGROUND OF THE INVENTION

Transmission of video information such as facsimile signals on frequency modulated carriers is preferable in many communication links such as the common voice band telephone line. However the bandwidth of such links is finite, in most practical cases 3 kilohertz or less, so that one bit of video information having a frequency close to that of the carrier may be carried by only one FM cycle, and loss of that cycle will result in loss of the bit of information.

For example, current methods of FM to AM signal conversion involve demodulation of the FM signal by the use of capacitative filter networks which pass the low frequency video or audio base band by averaging two or more FM cycles until a change in frequency is detected. Often the inherent, charge-discharge time characteristic of the capacitance requires five or more cycles, to detect an FM carrier frequency change, particularly at high frequencies. Consequently, the present demodulation techniques will not detect video information contained in frequency shifts of one cycle and bits of information are lost by averaging with other bits. In facsimile recording this information loss results in loss of detail, blurring, fuzziness and unsatisfactory quality of reproduction. While the problem is reduced by reducing the modulating frequency or by increasing the carrier frequency, the former introduces loss of detail initially, while the latter greatly increases the cost of transmission since transmission lines, for example, increase in cost roughly exponentially with respect to frequency.

Accordingly, one object of the present invention is to provide an FM video camera and AM video recorder system which converts and records the maximum amount of information carried by the FM camera signal, in particular the information carried by each FM cycle. A more specific object is to provide a direct, rather than demodulating, FM to AM converter which is economical and reliable, has no frequency limitations, which affords infinitely variable correction for the camera and recording paper response, accepts input signals of both polarities, and is extremely simple in adjustment.

STATEMENT OF INVENTION

According to the invention a video recording system comprises a video camera producing signals frequency modulated by video information; a facsimile recorder responsive to amplitude modulated signals to mark information upon a recording medium, and a direct FM to AM converter including a phase shifter having high and low frequency passing networks linked and responsive to the camera to split the frequency modulated signals into two out of phase components and means for summing the out of phase components to derive a resultant AM signal the amplitude of each of whose cycles is a function of a corresponding single cycle of the frequency modulated signal, the converter being coupled to the recorder, whereby the video information in substantially all the FM cycles is recorded.

Further according to the invention electronic apparatus for converting an FM signal to an AM signal comprises an operational amplifier responsive to each cycle of the FM input signal to vary the amplitude of each cycle as a function of its frequency, and a phase shifter comprising a low frequency pass filter network and a high pass filter network coupled to the amplifier, the networks respectively passing the amplitude modulated FM signal in two component signals and including means to shift the resepctive component signals out of phase, and means for summing the out of phase components, thereby to derive a resultant AM signal the amplitude of each of whose cycles is a function of the frequency of a corresponding cycle of the FM input signal, thereby retaining the information in substantially all the cycles of the FM input signal.

DRAWING

DESCRIPTION

Figures 1, 2, 3:
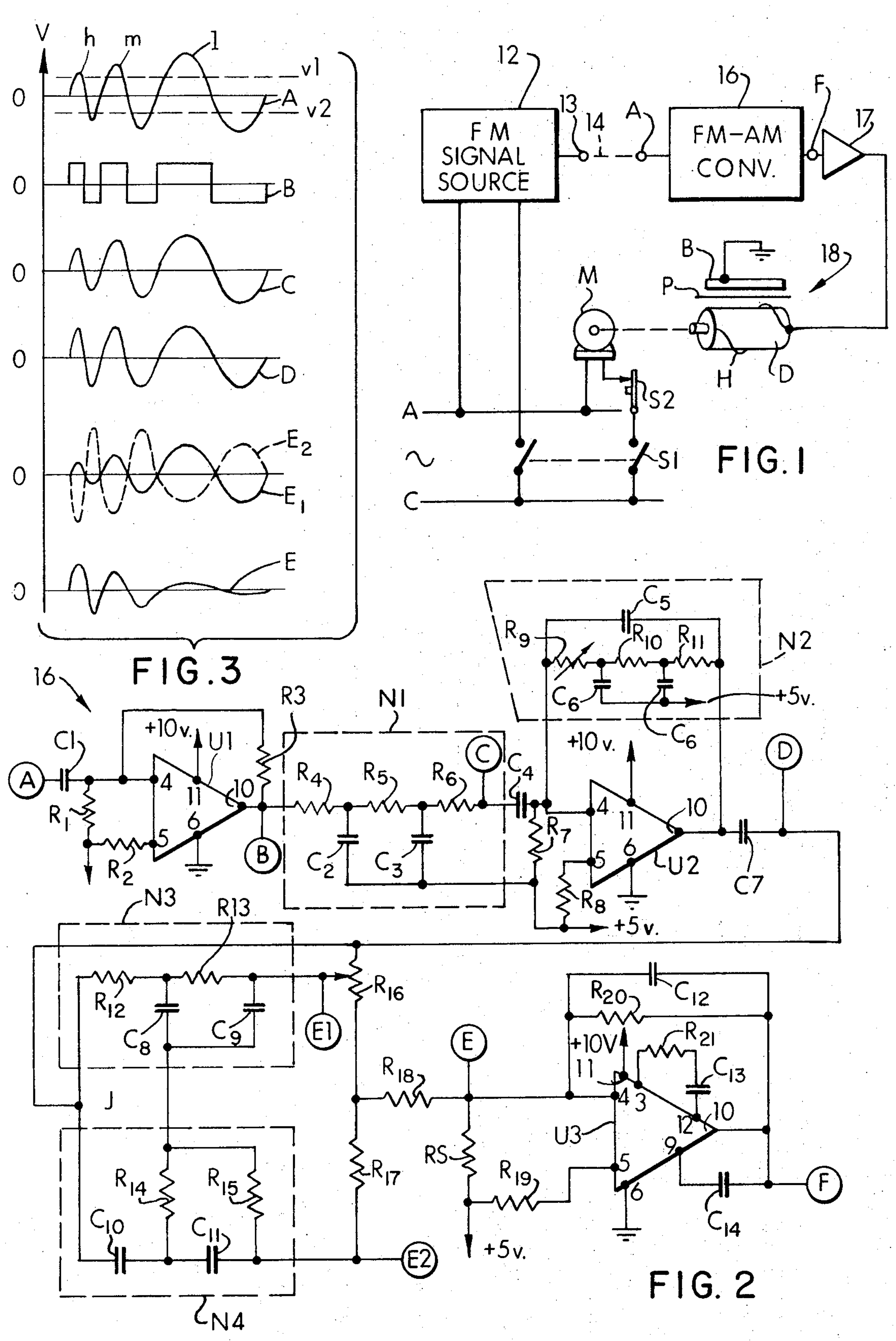
FIG. 1 is a diagrammatic showing of an FM video camera and facsimile recorder system including an AM to FM converter.
FIG. 2 is a schematic circuit diagram of the converter of FIG. 1.
FIG. 3 is a graphic representation of signal waveforms in the circuit of FIG. 2.

Shown in FIG. 1 is video recording system comprising a source 12 of video information frequency modulated on a carrier. The FM signal source 12 may be an FM television camera, a computer with an FM output or an FM receiver, as examples. The FM signal at the source output 13 is coupled by a transmission line 14 to the input A of a novel FM to AM converter 16 whose output F is an amplitude modulated signal containing the video information of the FM input. A marking amplifier 17 increases the power of the AM signal for application to a facsimile recorder 18 comprising a helical electrode H mounted on a rotating drum D and connected to the marking amplifier 17. Electrolytic or other electrosensitive paper P is fed between the helical electrode H and an opposed linear or blade electrode B and marked with the AM signal line by line as the drum D is rotated by a motor M. The speed of motor rotation is synchronized with the scan rate of the signal source 12 by connection to alternating current lines A and C common to the signal source. A two pole ganged switch S1 may be used to start scan in both the signal source 12 and recorder 18. The motor M is preferably a four-pole, 1,800 r.p.m. synchronous reluctance type such as Holtzer-Cabot Corp. Model S. By momentarily opening a key S2 in its supply connection, such a motor can be caused to retard its rotation stepwise from pole to pole to synchronize the framing of the recorder with that of the source.

According to the present invention the FM signals from the course 12 are converted to an amplitude modulated signal suitable for application to the recorder 18 without demodulating the FM signal or restoring it to DC form, and in a way which, with negligible exception, preserves for recording each bit of original video information modulated on the FM signal carrier by means of the FM to AM converter 16 of FIG. 1 shown in detail in FIG. 2. In FIG. 2 direct current supply voltages 5 v. and 10 v. are supplied from a suitable power source.

As shown in FIGS. 2 and 3 the FM-AM converter generally comprises a FM signal A input, a limiter U1, a passive low frequency pass network N1, an active high frequency pass network and gamma corrector N2–U2, a phase shifting and comparator network N3, N4 and Rs, and an output amplifier U3.

LIMITER U1

The FM-AM converter 16 receives at its input a raw FM signal waveform A which, by way of example, comprises relatively high, low and intermediate frequency components *h*, *l* and *m*. An FM voice band television camera such as the Model 80 camera of Robot Research, Inc., San Diego, California is suitable for producing such signals modulated between 1.5 and 2.5 kilohertz and capable of being transmitted over the most common and least expensive voice-grade telephone lines. Various parts of such a communication link will introduce some amplitude modulation shown in waveform A as a higher amplitude in the medium and low frequencies *m* and *l* than in the highs *h*. The first, limiter stage of the converter 16 is an operational amplifier U1 (Motorola type MC1741CP-2) to whose inverting input 4 the FM signal A is applied through a coupling capacitor C1 (0.0022 microfarad). Bias resistors R1 and R2 (100 kilohms) between input 4 and non-inverting input 5 limit the signal A at voltage levels *v*1 and *v*2 producing a constant amplitude square wave voltage B at the output of the amplifier U1 for each cycle of the FM signal A thus removing the unwanted amplitude modulation. A 4.7 megohm resistor R3 between the output B and input 4 provides only enough feedback to stabilize the operational amplifier U1.

LOW AND HIGH PASS NETWORKS N1 & N2

The square wave output of the first stage is applied through a low frequency pass network N1 to the inverting input 4 of a second operational amplifier U2 (Motorola type MC1741CP-2) having a similar frequency pass filter in the feedback connection between its output terminal 10 and its inverting input 4. The low pass network N1, which is passive, comprises a pi filter including resistors R4, R5 and R6 (10 kilohms) and capacitors C2 and C3 (0.1 microfarad) which pass the low frequency components of the square wave B and attenuate the highs thereby restoring a sine wave form C of each square wave cycle without frequency change. The low pass network N1 attenuates the restored high frequency waves *h* somewhat, but as a linear function of frequency which can be compensated by the high pass network N2. The second pass network N2 comprises potentiometer R9 (0–100 kilohms with a typical setting of 82 kilohms), R10 and R11 (10 kilohms), capacitors C6 (0.0047 microfarad), and capacitor C5. The second network N2 passes low frequency as does the first network N1, but because of its feedback connection to the inverting input 4 of amplifier U2 acts with the amplifier as a high frequency pass device by suppressing low frequencies. Because the two networks are comparable in attenuating effect as a function of frequency, unwanted amplitude modulation of one network may be balanced by that of the other and the output D of the second operational amplifier U2 is a substantially constant amplitude sinusoidal FM signal.

GAMMA CORRECTION R9

Although the ultimate object of a video printing system is to record all details of the original or computer generated graphic material with fidelity to the black and white values, various of the transducers in the communicate link such as photocells, camera tubes, transmission lines and recording paper may emphasize the black values represented by the high frequencies or the whites represented by the lows. This undesired emphasis may be compensated in the high pass network N2 by adjustment of the potentiometer R9. By causing the high pass network N2 to pass more or less of the highs the gamma characteristic of the ultimate printed record may be adjusted in the high-low pass stage, eliminating the need of special gamma correction stages.

PHASE SHIFTER N3, N4 AND COMPARATOR R17

The gamma corrected, constant amplitude sinusoidal FM signal output D of the high and low pass networks N1 and N2 is coupled by a capacitor C7 (1 microfarad) to the input junction J of low and high frequency phase shifting networks N3 and N4. Each network comprises a pi network with 6.2 kilohm resistors R12 to R15 and 0.01 microfarad capacitors C8-C11. However, the positions of the resistors and capacitors are reversed in the respective networks so that low frequencies are resistively coupled through the low pass network N3, whereas high frequencies are capacitatively coupled through the high pass network N4. Consequently the low pass network N3 attenuates high frequencies and the high pass network N4 attenuates low frequencies. Additionally the reversal of the resistor and capacitor positions in the respective networks causes the low pass network N3 to retard all frequencies by an approximately 90° phase shift, while the high pass network advances all frequencies 90°. The net phase shift of 180° is shown in FIG. 3 wherein the low pass solid line waveform E1 is shown opposite in phase to the high pass broken line waveform E2. It is preferable to attenuate some frequency equally in both networks. This equal attenuation or crossover frequency is adjusted by a potentiometer R16 (0–200 kilohms) with respect to a 33 kilohm resistor R17. As shown in FIG. 3 the low frequencies representing white in the original video signal are shown equal in amplitude in both waveforms E1 and E2.

The two waveforms are added in a summing resistor Rs (100 kilohms) to derive a resultant signal E each cycle of which is amplitude modulated by the difference between corresponding cycles of the phase shifted FM signals E1 and E2. The resultant signal E is an FM signal with substantially all the cycles of the input FM signal A, but which is now amplitude modulated as a function of the frequency of each cycle. An AM signal is thus derived without demodulation, averaging or appreciable loss of FM cycles or the bits of video information each cycle may represent.

OUTPUT AMPLIFIER J3 the AM-FM signal E is applied to the inverting output 4 of a third operational amplifier U3 (Texas Instrument type SN72709N) whose non-inverting input is biased by a 100 kilohm resistor R19. The amplifier U3 is substantially linear with a sinewave shaping feedback circuit including a resistor R20 (330 kilohm) and a capacitor C12 (220 picofarad) and a linearity filter consisting of a resistor R21 (1.5 kilohms) and capacitors C13 (0.0047 microfarad) and C14 (220 picofarad). The output F of the amplifier U3 is a substantially unchanged form of the AM-FM signal E.

It should be understood that the present disclosure is for the purpose of illustration only and that this invention includes all modifications and equivalents which fall within the scope of the appended claims.

I claim:

1. An electrical converter of information signals frequency modulated on a carrier comprising:

a phase shifter including a high frequency pass network and a low frequency pass network with a common input to which the frequency modulated carrier is applied, the networks splitting the carrier into components differing in amplitude in the high and low frequencies, the high frequency network passing a component with higher amplitudes in the high frequencies and the low frequency network passing a component with higher amplitudes in the low frequencies, and the network being effective to shift the phase of the respective components, and means connected to the networks for summing the amplitudes of respective out of phase carrier components to derive a resultant signal amplitude modulated as a function of the modulation on the carrier, whereby the frequency modulating information is converted to amplitude modulating information.

2. A converter according to claim 1 wherein the networks have a time characteristic responsive to substantially all the cycles of the carrier.

3. A converter according to claim 1 wherein the summing means has a time characteristic responsive to substantially all cycles of the carrier.

4. A converter according to claim 1 in combination with a selected frequency band pass filter coupled to the common input to the frequency pass networks to apply to frequency modulated carrier thereto in substantially constant amplitude sinusoidal form.

5. A combination according to claim 4 wherein the filter includes adjustable impedance means for varying the signal amplitude of the selected frequency band thereby to control the gamma characteristic of the passed signal.

6. A combination according to claim 4 comprising an operational amplifier and a second filter passing a predominantly different frequency band, the first band pass filter being connected to the negative feedback terminals of the operational amplifier, and the operational amplifier being connected to the phase shifter.

7. A converter according to claim 1 wherein each frequency pass network comprises a pi resistor-capacitor network.

8. A converter according to claim 7 wherein the resistors and capacitors are reversed in position in respective pi networks.

9. A converter according to claim 1 in combination with signal amplitude responsive means connected to the summing means for recording the resultant signal.

10. A converter according to claim 1 wherein the phase shifter introduces substantially a 180 degree phase difference between respective components.

11. A converter according to claim 1 wherein the phase shifter includes variable impedance means selecting the frequencies split from the carrier.

12. A converter according to claim 1 wherein each network comprises means to attenuate a frequency band, and at least one network comprises variable attenuating means for selecting a frequency for equal attenuation in both networks.

13. The method of converting frequency modulation signals on a carrier to amplitude modulated signals which comprises:

splitting the carrier into relatively high and low frequency components differing in amplitude in respective frequencies as a function of frequency, shifting the phase of the respective components, and summing the amplitudes of the respective components to derive a resultant amplitude modulated signal comprising substantially all the cycles of the carrier.

14. The method according to claim 13 wherein the amplitude of one component is varied independently of the other thereby to control the gamma characteristic of the resultant signal.

* * * * *